A. R. BLEWETT.
HARVESTER AND LIKE DRAFT ADJUSTMENT.
APPLICATION FILED FEB. 25, 1909.
937,410.
Patented Oct. 19, 1909.
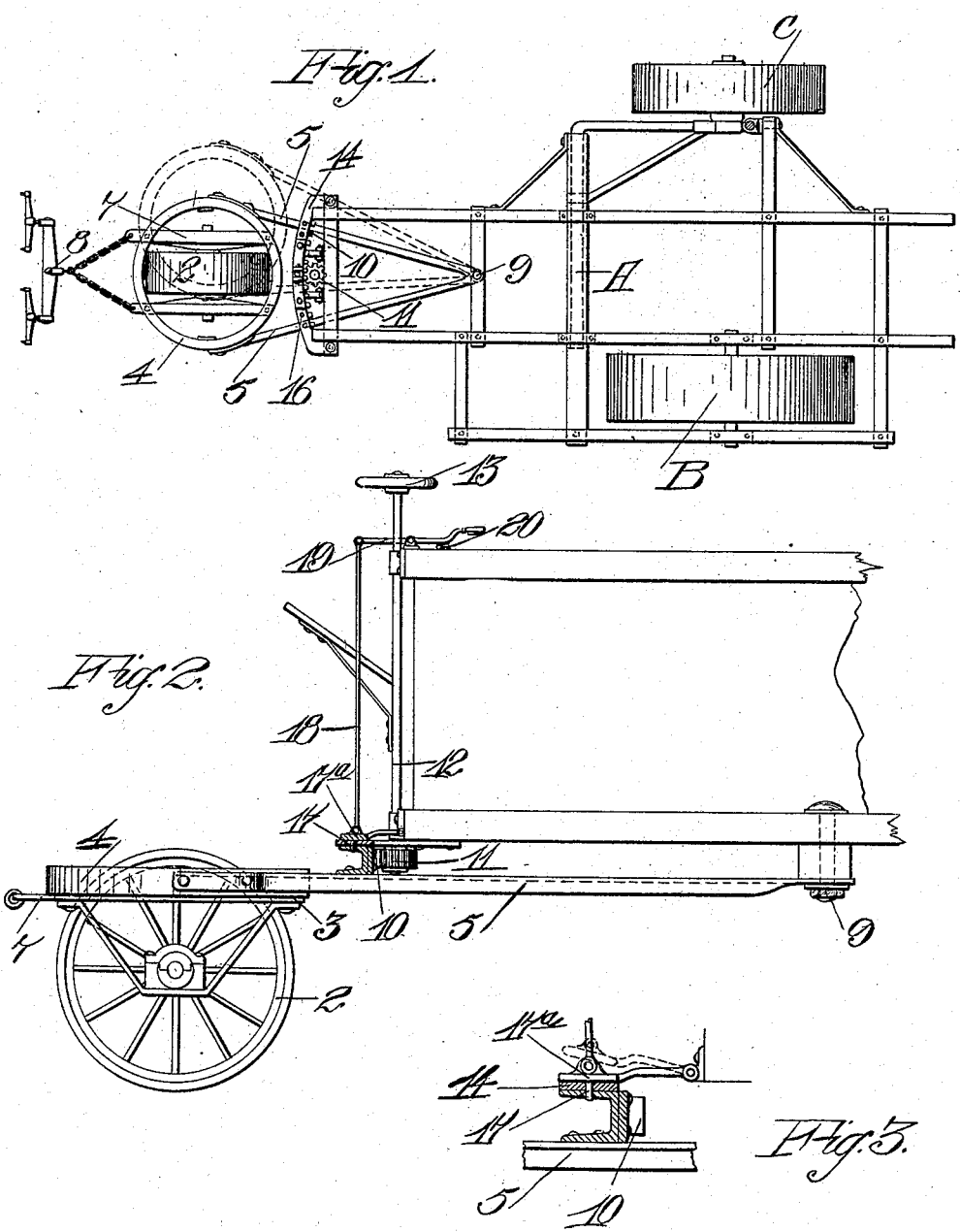

UNITED STATES PATENT OFFICE.

ARTHUR R. BLEWETT, OF SPOKANE, WASHINGTON.

HARVESTER AND LIKE DRAFT ADJUSTMENT.

937,410.  Specification of Letters Patent.  Patented Oct. 19, 1909.

Application filed February 25, 1909. Serial No. 479,875.

*To all whom it may concern:*

Be it known that I, ARTHUR R. BLEWETT, citizen of United States, residing at Spokane, in the county of Spokane and State of Washington, have invented new and useful Improvements in Harvester and Like Draft Adjustments, of which the following is a specification.

My invention relates to improvements in draft adjustment for harvesters and other agricultural machinery.

It consists in improved constructions and arrangement of parts whereby the steering and draft mechanism may be shifted to one side or the other of the harvester so as to substantially eliminate all side draft, and in details of construction which will be more fully explained by reference to the accompanying drawings, in which—

Figure 1 is a plan view of my device; and Fig. 2 is a side elevation, showing its application. Fig. 3 is a section of the rack plate and pin connection.

In the construction of combined harvesters, the main frame carrying the threshing and cleaning apparatus is supported upon bearing-wheels, from one of which most of the power is derived to drive this portion of the machinery. The wheel upon the other side of the machine supplies power to drive the heading mechanism, and this header normally projects to a great distance to one side of the machine. There are constant variations in the draft, there being sometimes a strong tendency of the machine to twist one way or the other; this depending in a measure upon the character of the land, and also upon the luxuriance or thinness of the grain which is being harvested. A is a portion of the frame of such an apparatus; B is the left, and C the right-hand wheel, from which power is derived respectively to drive the threshing and heading portions of the apparatus.

2 is a steering-wheel of the usual construction, and this is journaled in a frame which is fixed to and turnable with a ring 3, adapted to turn within another horizontally disposed ring 4.

Attached at suitable points to the inner periphery of the inner ring are U-shaped clips extending over the upper and under surfaces of the outer ring and adapted to prevent the two rings from being thrown out of their true relation to each other.

The team is connected with the steering-wheel frame by means of bars 7, which are fixed to the ring 3, and extend forwardly and beyond the periphery of the ring 4, thus providing means for attaching the draft bar, and connecting chains, as at 8; the team being then attached to this in the usual manner, will turn the steering-wheel 2, and thus guide the machine. The ring 4 in prior constructions has been usually directly secured to the front of the threshing machine frame. In order to allow for an independent adjustment of this whole structure to one side or the other, for the purpose of counteracting side draft, in my construction I have substituted for this old connection, angle iron, tee or equivalent bars 5, whose forward ends are riveted to opposite sides of the ring 4, and whose rearward ends are carried back to a convenient point in the main frame and converging, are pivoted to the main frame by a king-bolt or pin, as at 9. Across the converging bars 5 is fixed a rack bar 10. This rack bar is curved upon a radius of which the king-bolt 9 is the center.

In suitable relation with the rack bar, and in the present case, shown above it, is an arched plate 14, having a curvature similar to that of the toothed rack-bar 10, and having its ends firmly fixed to the frame of the machine. This plate has holes made through it, as at 16, and co-incidentally in the rack bar 10, are similar holes adapted to receive pins 17.

11 is a pinion fixed to a vertical turnable shaft 12, and this shaft has a hand-wheel 13, or equivalent attachment, by which it may be turned.

The pins 17 in the hinged plate 17ª are connected by rod 18, with a hand lever 19 fulcrumed at a point convenient to the operator, and by means of a spring or equivalent device, as at 20, the lever is moved to force these pins downward. Thus, there being a series of holes in the rack bar, by placing the foot on the lever 19, the spring will be compressed, the pins will come out of engagement with the holes in the rack bar 10, and by turning the wheel 13, and the pinion 11, the rack bar 10 will then be caused to travel transversely of the machine, thus swinging the pivoted bars 5, and with them the mechanism carrying the steering-wheel.

When a proper adjustment has been made to resist the particular side draft then occuring, by releasing the lever 19, the pins 17 will drop into the coincident holes of the rack bar 10, and lock the device in that position; the steering will continue to be effected by turning the horses to one side or the other, but the position of the steering-wheel with relation to the main traction and power wheels will be such as to counteract any tendency to side draft in whichever direction it may occur.

Having thus described my invention, what I claim and desire to secure by Letters Patent is—

1. A device for adjusting the draft of harvesters and the like, said device consisting of a V-shaped frame pivoted to the main frame at a point remote from and in rear of the steering-wheel and secured to a ring in front of the machine, a steering-wheel mounted in a second ring adapted to turn within the first mentioned ring, means by which the draft animals are connected with the steering-wheel ring, and a rack and pinion by which the steering-wheel and its mountings are independently turned and their line of travel with relation to the main frame adjusted.

2. In a device of the character described, a ring, a steering-wheel mounted in a second ring turnable with relation to the first mentioned ring and having attachments for the draft animals, arms bolted to the outer ring extending rearwardly beyond the steering-wheel and into the main frame and having a king-bolt attachment to the main frame, a curved rack fixed to said arms, a pinion engaging said rack mounted upon a vertical shaft, and a steering-wheel by which the pinion may be turned and the rack moved to one side or the other.

3. In a device of the character described, a steering-wheel mounted in a ring adapted to turn within an exterior ring and having connection for the draft animals, arms bolted to the outer ring converging to a point in rear of the steering wheel and to a king-bolt upon the main frame, a curved rack bar fixed across said arms, a vertically journaled shaft having a pinion secured thereto and engaging the teeth of the rack, a curved plate fixed to the main frame above the rack bar, said rack bar and said plate having holes made therein, a spring-pressed lever, connecting-rod and pins adapted to lock the said rack bar and the said plate, and maintain the adjustment of the steering-wheel.

In testimony whereof I have hereunto set my hand in presence of two subscribing witnesses.

ARTHUR R. BLEWETT.

Witnesses:
W. S. GILBERT,
A. C. RHODINE.